(12) United States Patent
Cascaval et al.

(10) Patent No.: US 8,886,887 B2
(45) Date of Patent: Nov. 11, 2014

(54) UNIFORM EXTERNAL AND INTERNAL INTERFACES FOR DELINQUENT MEMORY OPERATIONS TO FACILITATE CACHE OPTIMIZATION

(75) Inventors: Gheorghe Calin Cascaval, Carmel, NY (US); Yaoqing Gao, North York (CA); Allen Russell Martin, Toronto (CA); Mark Peter Mendell, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 2178 days.

(21) Appl. No.: 11/686,543

(22) Filed: Mar. 15, 2007

(65) Prior Publication Data

US 2008/0229028 A1    Sep. 18, 2008

(51) Int. Cl.
*G06F 9/45* (2006.01)

(52) U.S. Cl.
CPC .................................. *G06F 8/4442* (2013.01); *G06F 2212/6028* (2013.01)
USPC .......................................... 711/137; 717/151

(58) Field of Classification Search
CPC ............ G06F 8/4441–8/4442; G06F 9/30047; G06F 9/3802–9/381; G06F 9/383–9/3832; G06F 12/0862; G06F 2212/602–2212/6028; G06F 2216/13
USPC ................... 711/118–146, 213; 717/136–161
See application file for complete search history.

(56) References Cited

U.S. PATENT DOCUMENTS

| | | | |
|---|---|---|---|
| 6,594,824 B1 | 7/2003 | Volkonsky et al. | |
| 6,928,645 B2 | 8/2005 | Wang et al. | |
| 7,571,432 B2 * | 8/2009 | Heishi et al. | 717/151 |
| 2003/0145314 A1 * | 7/2003 | Nguyen et al. | 717/158 |
| 2005/0086652 A1 | 4/2005 | Tian et al. | |
| 2005/0086653 A1 * | 4/2005 | Heishi et al. | 717/151 |
| 2005/0138294 A1 | 6/2005 | Serrano et al. | |
| 2006/0048120 A1 * | 3/2006 | Archambault et al. | 717/160 |
| 2006/0143421 A1 * | 6/2006 | Subramoney et al. | 711/170 |

OTHER PUBLICATIONS

Reynolds et al., "Pip: detecting the unexpected in distributed systems", Proceedings of the 3rd Conference on 3rd Symposium on Networked Systems Design & Implementation, vol. 3, 2006, http://issg.cs.duke.edu/pip/nsdi06preprint.pdf.
Cascaval, "Estimating cache misses and locality using stack distances", ICS '03: Proceedings of the 17th annual International conference on Supercomputing, 2003, pp. 150-159, New York.
Cascaval et al., "Compile-Time Based Performance Prediction", Languages and Compilers for Parallel Computing, vol. 1863/2000, 2000, pp. 365-379, Berlin. http://www.springerlink.com/content/qucggkfnc91my751/fulltext.pdf.

(Continued)

*Primary Examiner* — April Y Blair
*Assistant Examiner* — Nicholas Simonetti
(74) *Attorney, Agent, or Firm* — Yee & Associates, P.C.; Parashos Kalaitzis

(57) ABSTRACT

A computer implemented method, software infrastructure and computer usable program code for improving application performance. A delinquent memory operation instruction is identified. A delinquent memory operation instruction is an instruction associated with cache misses that exceeds a threshold number of cache misses. A directive is inserted in a code region associated with the delinquent memory operation to form annotated code. The directive indicates an address of the delinquent memory operation instruction and a number of memory latency cycles expected to be required for the delinquent memory operation instruction to execute. The information included in the annotated code is used to optimize execution of an application associated with the delinquent memory operation instruction.

33 Claims, 5 Drawing Sheets

(56) References Cited

OTHER PUBLICATIONS

Zhang et al., "A Self-Repairing Prefetcher in an Event-Driven Dynamic Optimization Framework", Proceedings of the International Symposium on Code Generation and Optimization (CGO'06), 2006, IEEE Computer Society, pp. 1-12.

Panait et al., "Static Identification of Delinquent Loads", Proceedings of the International Symposium on Code Generation and Optimization (CGO'04), 2004, IEEE Computer Society, pp. 1-12.

Kim et al., "Implementing Stack Simulation for Highly-Associative Memories", Proceedings of the 1991 ACM SIGMETRICS Conference on Measurement and Modeling of Computer Systems Table of Contents, San Diego, California, US, pp. 212-213.

Collins et al., "Speculative Precomputation: Long-range Prefetching of Delinquent Loads", 2001 IEEE, pp. 1-12.

Yang et al., "Tolerating Memory Latency through Push Prefetching for Point-Intensive Applications", ACM Transactions on Architecture and code Optimization, vol. 1, No. 4, Dec. 2004, pp. 445-475.

Adl-Tabatabai et al., "Prefetch Injection Based on Hardware Monitoring and Object Metadata", PLDI'04 Jun. 2004, Washington DC, pp. 267-276.

* cited by examiner

UNIFORM EXTERNAL AND INTERNAL INTERFACES FOR DELINQUENT MEMORY OPERATIONS TO FACILITATE CACHE OPTIMIZATION

BACKGROUND OF THE INVENTION

1. Field of the Invention

The present invention is related generally to a data processing system and in particular to a method and apparatus for a compiler. More particularly, the present invention is directed to a computer implemented method, apparatus, and computer usable program code for providing a uniform external and internal interface enabling a compiler to communicate information regarding delinquent memory operations with external user annotation, external tools and internally between passes for use in optimization.

2. Description of the Related Art

Memory latency dominates the performance of many applications on modern computer systems, despite continued advances in memory hierarchy techniques. Memory latency is the time that it takes a processor to retrieve or transfer requested data, such as a byte or word in memory, after the request is made.

A delinquent memory operation is a load or store operation that frequently has a long memory latency due to cache misses. The storage area of a computer system is typically organized as a hierarchy of levels, ranging from smaller and faster levels to larger and slower levels. A cache is a memory hierarchy level that can be accessed more rapidly than other storage areas, such as main memory or a hard disk. A memory hierarchy may contain several levels of cache with varying latencies and sizes. A cache miss occurs when a certain level of cache does not contain a data value needed by an executing instruction. Cache misses occur because the memory space in cache is generally limited as compared to other data storage types, such as hard disk space. If requested data is available in cache, memory latency is usually significantly shorter than if the data has to be retrieved from another memory hierarchy level. Thus, memory latency is a measure of the speed of memory retrieval. The lower the memory latency is, the more efficient memory retrieval operations are for an executing program.

Modern computing systems employ many techniques to increase the speed with which software executes. These techniques can be implemented in hardware as changes to the processor design, or in software as compiler optimizations. A compiler is a computer program that translates a series of statements written in a human readable language into a machine language, or otherwise modifies the code of a computer program. Compilers can reduce the latency of memory operations during program execution through certain optimizations, such as program data reorganization or insertion of software pre-fetching. These optimizations may be guided by static analysis at compile time or by dynamic analysis of cache misses using performance measurement tools. However, using currently available program performance measurement tools, it can be difficult to precisely identify delinquent memory operations.

This problem is particularly pronounced in modern processors, where instructions are grouped and tracked as a group throughout an execution pipeline. In such a case, several memory operation instructions may end up in the same instruction group and performance monitoring tools may not be able to precisely detect which instruction in the group is the instruction causing cache misses. Moreover, currently available compilers do not provide an interface for users and/or other software programs to communicate delinquent information to the compiler for use in reducing memory latency.

SUMMARY OF THE INVENTION

The illustrative embodiments provide a computer implemented method, apparatus, and computer usable program code for improving application performance. In one embodiment, a delinquent memory operation instruction is identified. A delinquent memory operation instruction is an instruction associated with cache misses that exceeds a threshold number of cache misses. A uniform interface is provided to preserve delinquent memory operation instruction information. Providing the uniform interface further includes inserting a directive in a code region associated with the delinquent memory operation to form annotated code. The directive indicates an address of the delinquent memory operation instruction and a number of memory latency cycles expected for the delinquent memory operation instruction to execute. The information included in the annotated code may be used to optimize the execution of an application associated with the delinquent memory operation instruction.

In one embodiment, the directive may be inserted in the code region before the delinquent memory operation instruction or immediately following the delinquent memory operation instruction. The directive may also be imbedded within the delinquent memory operation instruction in the code region. In another embodiment, a marker directive is inserted in the code region associated with the delinquent memory operation. The marker directive references a location in a table that contains the address of the delinquent memory operation instruction and a number of memory latency cycles expected to be required for the delinquent memory operation instruction to execute.

The delinquent memory operation instruction may be identified dynamically during runtime or statically during compile time. The directive in the code region is inserted in the code region automatically by the compiler. In another embodiment, the delinquent memory operation instruction may be identified manually by a user and annotated in the code region manually by the user.

The execution of an application associated with the delinquent memory operation instruction may be optimized using information obtained from the annotated code. Optimizing execution of the application can include scheduling execution of a set of two or more instructions to reduce a memory latency delay during execution of the set of two or more instructions. The set of two or more instructions includes the delinquent memory operation instruction.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
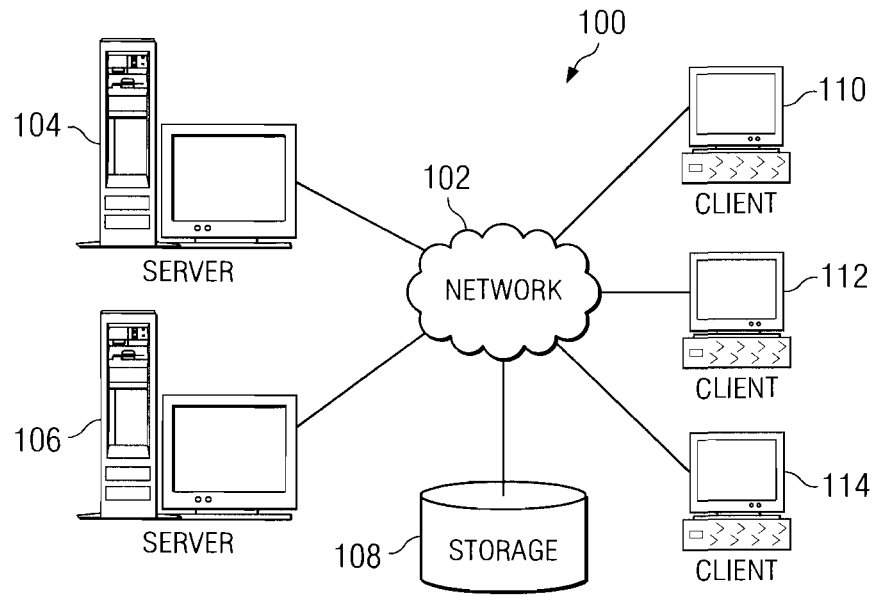
FIG. 1 is a pictorial representation of a network of data processing systems in which illustrative embodiments may be implemented.
Figure 2:
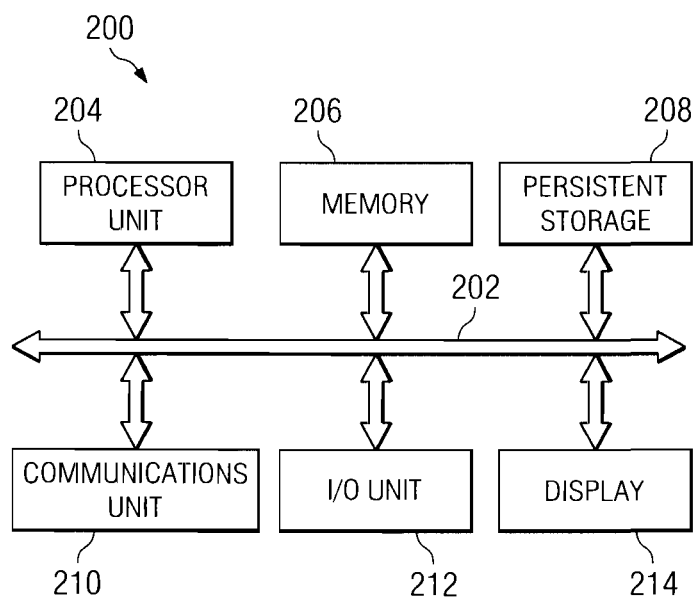
FIG. 2 is a block diagram of a data processing system in which illustrative embodiments may be implemented.
Figure 3:
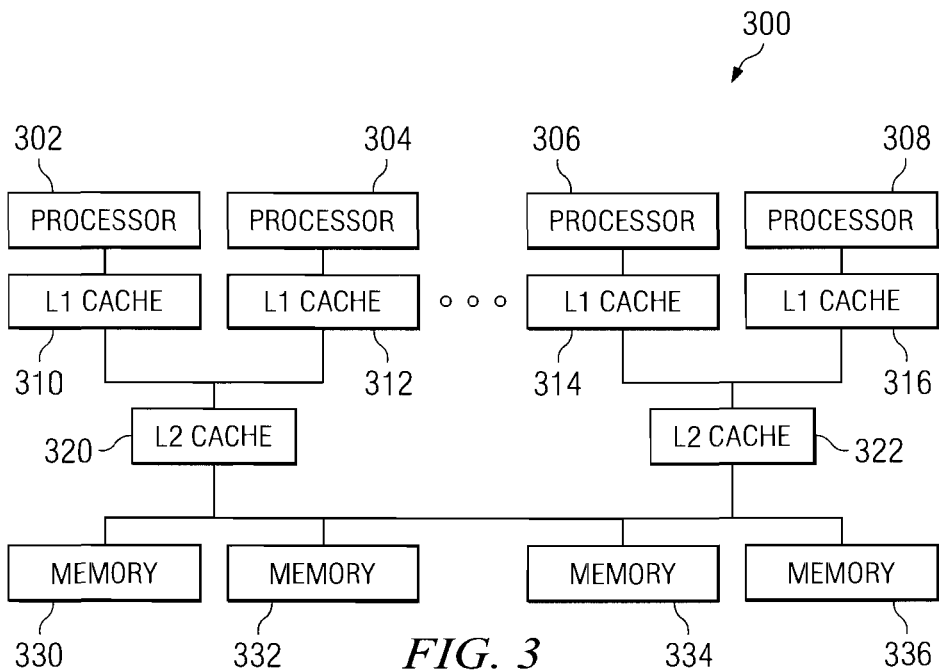
FIG. 3 is a block diagram of a memory hierarchy in which the illustrative embodiments may be implemented.

With reference now to the figures and in particular with reference to FIGS. 1-3, exemplary diagrams of data processing environments are provided in which illustrative embodiments may be implemented. It should be appreciated that FIGS. 1-3 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Turning now to FIG. 2, a diagram of a data processing system is depicted in accordance with an illustrative embodiment of the present invention. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. Memory 206, in these examples, may be, for example, a random access memory. Persistent storage 208 may take various forms depending on the particular implementation. For example, persistent storage 208 may be, for example, a hard drive, a flash memory, a rewritable optical disk, a rewritable magnetic tape, or some combination of the above.

Communications unit 210, in these examples, provides for communications with other data processing systems or devices. In these examples, communications unit 210 is a network interface card. I/O unit 212 allows for input and output of data with other devices that may be connected to data processing system 200. For example, I/O unit 212 may provide a connection for user input though a keyboard and mouse. Further, I/O unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206.

FIG. 3 is a block diagram illustrating a memory hierarchy in which the illustrative embodiments may be implemented. Data processing system 300 is a data processing system, such as network data processing system 100 in FIG. 1. Data processing system 300 in this example is a multiprocessor, which includes processors 302-308. Processor 302, 304, 306, and 308 may be any type of known or available processor for executing a process on a computing device, including, but not limited to, a central processing unit (CPU) or a digital signal processor (DSP). In this example, processor 302-308 are processors, such as processor unit 204 in FIG. 2.

Larger caches can hold more data values and therefore, suffer fewer cache misses. However, larger caches also result in longer memory retrieval latency due to the larger volume of data stored in the larger cache. Therefore, many memory hierarchies employ multiple levels of cache. The cache level closest to the processor, and therefore the fastest to access, is referred to as level one "L1" cache. The next level down is level two "L2" cache, and so forth.

In this example, between processor 302 and memory 330-336 there are several levels of cache, such as the level one "L1" Cache 310 and level two "L2" cache 320. These caches are storage areas that have lower access latencies than memory 330. The memory storage size for L1 310 and L2 320 cache is much smaller then the storage size for memory 330 because the memory space for cache is more costly. The closer the cache level is to the processor, the more quickly processor 302 can access the data stored in the cache and the lower the memory latency.

Different protocols exist for bringing in data from memory and replacing it in the cache when space in cache is needed. These protocols are invoked whenever the processor requests data that is not in the cache and a cache miss results. The illustrative embodiments address the problem of identifying which data locations are going to cause misses and proactively using existing memory retrieval and storage protocol mechanisms to put data that will be needed by a processor, such as processor 302, in a cache level that is as close to the processor as possible.

Until recently, many systems were being built with only one processor. However, that is changing rapidly and, as shown here in the FIG. 3, several processors can cache data from memory in different caches at different cache levels. In many systems, the caches are kept coherent by the hardware such that all processors have the same view of the data. However, the cache coherence protocol adds to the latency of memory operations, therefore increasing the need for good techniques that reduce latency by placing data as close to the processor as possible.

In this example, level one cache 310-316 is a L1 cache in a cache level closest to a processor. In this example, processor 302 accesses L1 cache 310, processor 304 accesses L1 cache 312, processor 306 accesses L1 cache 314 processor 308 accesses L1 cache 316.

Level two "L2" cache 320 and 322 are larger caches shared by multiple processors. In this example, processors 302 and 304 share L2 cache 320. Processors 306 and 308 share L2 cache 322.

Memory 330-336 is any type of known or available memory for storing data, including, but not limited to, main memory, random access memory (RAM), read only memory (ROM), non-volatile random access memory (NV-RAM), hard disk memory space, and/or a secondary data storage device. Thus, when processor 302 needs to retrieve a data value to perform an operation associated with executing code, processor 302 will check L1 cache 310 first because this is the quickest memory access with the lowest memory latency. If the data value is not present in L1 310 cache, processor 302 will check L2 cache 320. If the data value is not available in L2 cache 320, a cache miss has occurred and processor 302 will be forced to retrieve the data value from memory 330-336. The memory latency for data retrieval is the longest or greatest for retrieving data from memory 330-336.

A delinquent memory operation instruction is an instruction that results in a number of cache misses that is greater than an acceptable threshold number of cache misses. In other words, when processor 302 executes a delinquent memory operation instruction, processor 302 may experience a large number of cache misses and correspondingly large memory latency, as a result of these cache misses.

Figure 4:
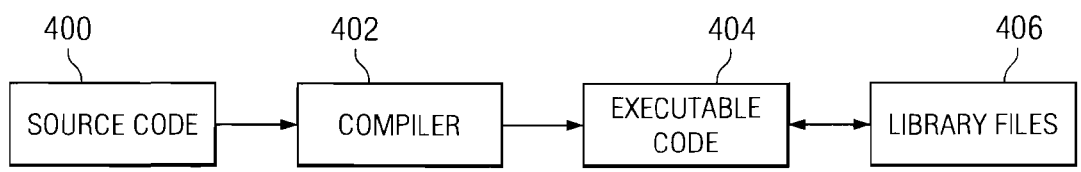
FIG. 4 is a block diagram illustrating an operation of a currently available compiler.

FIG. 4 is a block diagram representing the operation of a known compiler. Compilers are software programs that transform a program. For example, a compiler can transform a computer program written in a language more easily understandable to humans into a language more easily used by a computer. In this example, compiler 402 is said to compile source code 400 into executable code 404.

The illustrative embodiments recognize that a very small number of memory operation instructions associated with executing software can cause a large number of cache misses, which can dramatically degrade the performance of the executing software. Practitioners in the art refer to these instructions as delinquent memory operations. Therefore, identification of delinquent memory operations is important to make cache optimizations, such as data pre-fetching and data reorganization more effective. It will be appreciated by one skilled in the art that the words "optimize", "optimization" and related terms are terms of art that refer to improvements in speed and/or efficiency of a computer program, and do not purport to indicate that a computer program has achieved, or is capable of achieving, an "optimal" or perfectly speedy/perfectly efficient state.

The illustrative embodiments also recognize that compiled code can be optimized to reduce memory latency due to delinquent memory operation instructions by utilizing optimization processes such as, but not limited to, specific data prefetch using linked lists, speculative pre-computation, new architecture for data prefetch, and/or hardware extensions to gather delinquent memory operations if the location of delinquent memory operations in the source code and/or intermediate code can be identified at an earlier stage of compilation.

The illustrative embodiments provide a computer implemented method, apparatus, and computer usable program code for improving application performance. A delinquent memory operation instruction is a load or store instruction which frequently incurs performance degrading cache misses. An interface is designed to communicate delinquent information to the compiler and preserve it throughout the compilation and optimization process.

One embodiment uses a directive inserted in a source code region associated with the delinquent memory operation instruction, thus producing annotated code. A code region is any section or segment of code. The directive may be inserted in the code region before the delinquent memory operation instruction, immediately following the delinquent memory operation instruction, or within the delinquent memory operation instruction to indicate which memory operation is delinquent. Thus, the directive may be inserted at the end of the code region preceding the code region containing the delinquent memory operation instruction, at the beginning of a code region following the code region containing the delinquent memory operation, at the beginning of the same code region including the delinquent memory operation instruction, at the end of the same code region including the delinquent memory operation instruction, or inserted within the delinquent memory operation instruction within the same code region. The directive inserted in the code region associated with the delinquent memory operation indicates which code region has one or more delinquent memory operations. Annotated code is any program code that includes the delinquent memory directive of the illustrative embodiments.

The memory delay directive indicates the address of the delinquent memory operation instruction and the number of cycles expected to be the latency of that instruction. Information included in the annotated source code is used by the compiler or runtime system to optimize the execution of the application by taking actions to reduce the latency of the delinquent memory operation.

In another embodiment, a system is provided for improving application performance. The system includes a compiler for identifying a delinquent memory operation instruction associated with one or more cache misses and inserting a directive in a code region associated with the delinquent memory operation instruction. The directive may be inserted in the source code or in an intermediate language representation of the code, such that the compiler may use this information to guide optimization. The directive indicates the address of the delinquent memory operation instruction and the number of cycles expected to be the latency of that instruction. The system also uses the memory delay directive as a uniform interface for analysis tools to communicate delinquent information to the compiler. Optimization tools utilize information included in the annotated code to optimize execution of an application associated with the delinquent memory operation instruction.

Figure 5:
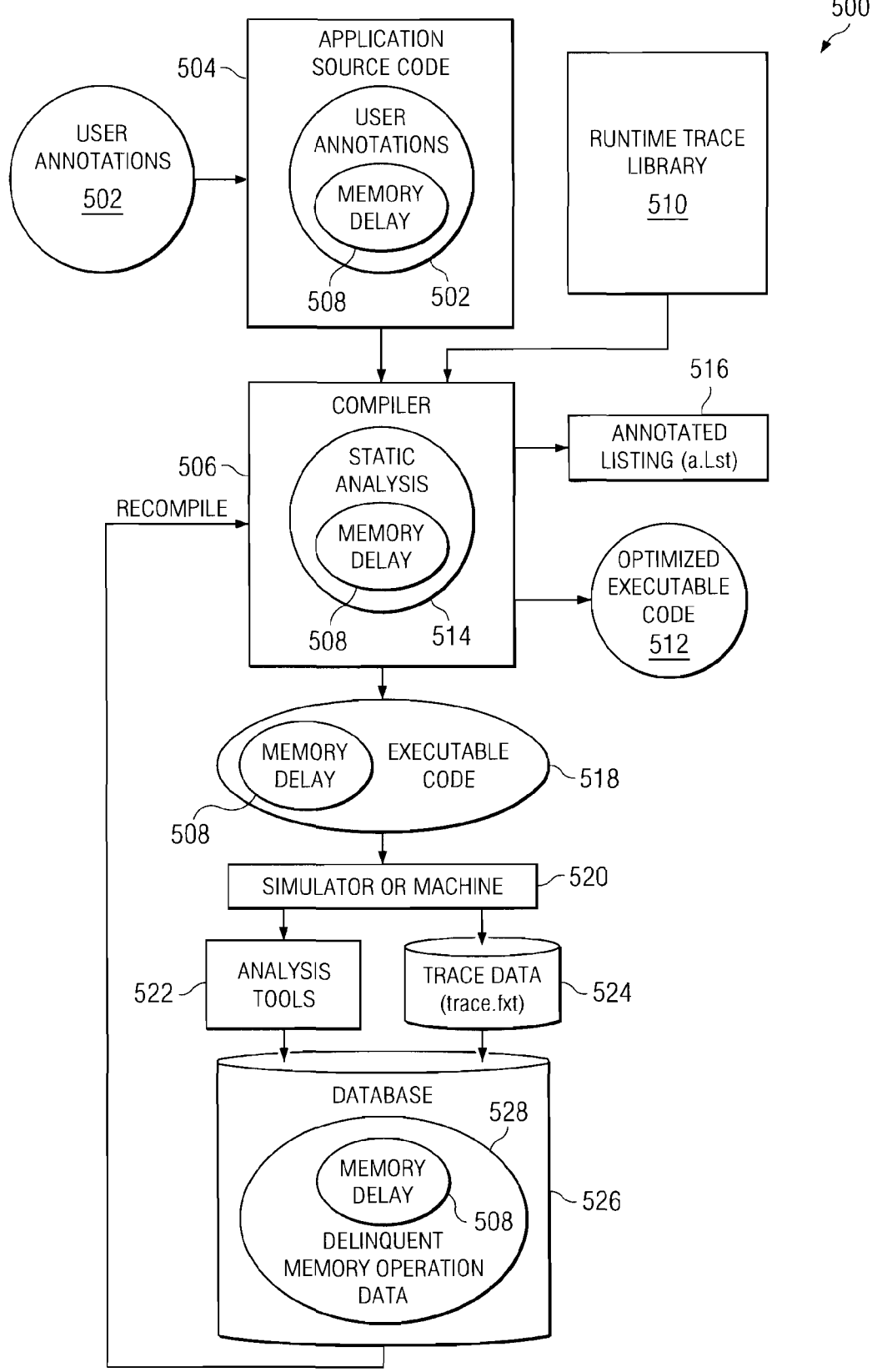
FIG. 5 is a block diagram illustrating a dataflow when a uniform interface is utilized internally to provide delinquent information to a compiler for use in optimizing software execution in accordance with an illustrative embodiment.

Turning now to FIG. 5, a block diagram illustrating a dataflow when a uniform interface is utilized to provide delinquent memory operation information to a compiler for use in optimizing software execution is depicted in accordance with an illustrative embodiment. Data processing system 500 may be any type of data processing system, including, but not limited to, data processing system 100 in FIG. 1 or data processing system 200 in FIG. 2.

Optimizing software execution refers to the process of tuning the output of a compiler to reduce execution time by minimizing memory latency during execution of compiled program code. Optimization operations may include, but are not limited to, loop optimization. Loop optimizations refer to operations that reduce the amount of memory latency which occurs due to executing loops. Loop optimizations may include, without limitation, loop unrolling, loop interchange, loop reversal, loop splitting, and/or loop un-switching.

User annotations 502 are annotations entered into application source code 504 by a user. User annotations 502 are metadata inserted or added to program code. User annotations 502 are suggestions or hints regarding the occurrence and location of memory operation instructions that may result in cache misses, such as delinquent loads and delinquent stores. User annotations 502 may also include information regarding the number of memory latency cycles that are expected to occur and/or hints or suggestions as to actions that may be taken by compiler 506 and/or other components to adjust for the expected cache misses.

Compiler 506 is a set of one or more compilers, such as, but not limited to, compiler 402 in FIG. 4. Compiler 506 can include any type of known or available compilers, including, but not limited to, optimizing compilers, dynamic compilers, cascaders, transcompilers, or any combination of compilers. In this example, compiler 506 is an optimizing compiler.

Compiler 506 uses user annotations 502 to reduce memory latency during execution of the application associated with application source code 504.

Application source code 504 includes memory operations. A memory operation instruction is delinquent if it may result in long memory latency due to cache misses that occur during execution of the application that exceeds a threshold number of cache misses. A delinquent memory operation instruction is identified using any known or available method for identifying a delinquent memory operation instruction prior to compilation of the application code, at compile time, at runtime, or at any other stage in the life-cycle of the application software.

User annotations 502 include any means of denoting delinquent memory operations. A compiler can transform these annotations into memory delay 508. Memory delay 508 is a directive _mem_delay( ), such that a uniform interface for representing delinquent memory operations is used throughout the compilation and execution process. In the current embodiment, we chose to represent this interface as a directive _mem_delay, however, it should be noted that any other mechanism to preserve the delinquent information can be used. Memory delay 508 is a directive that provides a uniform interface to permit a user and/or software components to communicate information regarding delinquent memory operation instructions to compiler 506. A user annotates a delinquent memory operation by inserting memory delay 508 into application source code 504. In one example, a memory delay directive, such as memory delay 508, may be made by inserting the following code into application source code 504:

_mem_delay(memory_address, memory_latency_cycle_count)

Memory delay 508 is a directive used for a framework that enables a uniform interface between compiler 506 and one or more other hardware and/or software components, such as simulator or machine 520, analysis tools 522, and database 526. Memory delay 508 provides information regarding where cache misses occur.

For example, a memory delay directive might specify the address of an instruction in application source code 504 and/or executable code 518, or the intermediate code corresponding to the delinquent memory operation instruction in the executable code that causes many cache misses when the executable code is executed by a processor. The memory delay directive leaves the decision as to appropriate action needed to reduce memory latency up to compiler 506. In other words, compiler 506 must determine what optimization methods may be useful to reduce the memory latency.

The uniform interface enables different components to communicate delinquent memory operation instruction information to compiler 506 in a uniform manner using the same framework or functions.

An example of a memory delay interface declaration is as follows:

void _mem_delay (const void*address, const unsigned int cycles);

The memory delay directive shown here may be used by a user and/or cache profiling tools to specify where cache misses occur. Runtime trace library 510 may be linked to compiled code generated by compiler 506 to provide mem_delay directive to cache profiling tools. "Address" is the address of any data item that can legally be passed by reference to a subprogram and "cycles" is an integer value or equivalent parameter. This statement may be inserted immediately before or immediately following a statement which contains a specified memory reference. Compiler 506 will ignore the statement if there are no memory references that match the given address. If there are multiple memory references matching the address specified in memory delay 508, the compiler will select one of those memory operations based on a policy that can be the first such memory operation, the last memory operation, or any other of the memory operations determined by the compiler optimization algorithm. The term "cycles" refers to a value for memory latency which reflects either a level one (L1) miss latency or a level two (L2) miss latency.

Thus, an example of a memory delay directive is as follows:

```
while (record!= NULL) {
record=list;
__mem__delay(&record->field),10);
data=record->field;
record= record->next;
sum+=data;
}
```

The example shown above is statements in C programming language. However, memory delay directive is general and not limited to C programming language. In other words, the memory delay directive could be in any form for providing a uniform interface generated using code associated with any known or available programming language.

Compiler 506 can keep and/or pass delinquent information to various optimization phases without a significant negative performance impact through the same internal memory delay directive. For example, the delinquent information may be used for both high-level cache locality transformation and low-level instruction scheduling. Furthermore, memory delay 508 can be used to query for cache misses during dynamic profiling to verify if a given memory reference causes any cache misses. In other words, memory delay directive 508 can be used as a query of cache misses at runtime. A memory reference marked by memory delay directive can be verified and confirmed through runtime checks. In this manner, if a user annotations 502 suggests that a given memory operation is delinquent, memory delay directives can be used to verify whether the annotated memory operation instruction is actually delinquent and determine the number of memory latency cycles associated with that delinquent memory operation instruction.

Compiler 506 uses user annotations 502 and memory delay 508 to form optimized executable code 512. Optimized executable code 512 reduces memory latency during execution of the application associated with application source code 504 as compared to object code or executable code generated from application source code in the absence of user annotations and a memory delay directive.

Compiler 506 can use user annotated delinquent memory operation instructions in application source code 504 to perform optimizations, such as data pre-fetch, data reorganization, data locality optimizations, and/or instruction scheduling to reduce or tolerate memory latency. In this example, memory delay 508 is a highly specialized directive used by experienced programmers with knowledge of compiler optimizations and underlying architectures and their applications to fine-tune their applications by manually inserting memory delay directive 508 into application source code 504.

In another example, the compiler uses user annotations 502 to generate optimized object code. However, user annotations 502 are only hints or suggestions from a user regarding possible memory latency cycles associated with memory operations. Therefore, compiler 506 performs static analysis 514 of the compiled object code during compile time to generate hints or suggestions from compiler 506 regarding possible delinquent memory operations that could result in a number of cache misses that exceed a threshold number of cache misses. Any threshold number of cache misses may be set. The threshold of cache misses may be a user selected number and/or a preset or default number of cache misses. The threshold may be one cache miss and/or two or more cache misses. Compiler 506 also uses static analysis 514 to estimate the number of cache misses that may occur during execution of the application. Static analysis is the analysis of software code that is performed without actually executing or running the software. Generally, compiler 506 performs static analysis 514 on object code. However, compiler 506 may also perform static analysis 514 on application source code 504 prior to generating the object code or intermediate compiled code.

Compiler 506 uses the results of static analysis 514 to generate delinquent memory operation information. Compiler 506 adds annotations in the form of memory delay directive to the intermediate code for further compiler optimizations or to the executable code for dynamic profiling. The annotations are metadata regarding delinquent memory operation information in the user code, intermediate compiler code, or the executable code. Compiler 506 makes use of the delinquent information to generate optimized executable code 512 which reduces or reduces memory delays resulting from the identified delinquent memory operations.

Compiler 506 also generates an annotated listing 516 of code during compilation of application source code 504. Annotated listing 516 is a listing of information about instruction groups, what optimizations are performed by the compiler, what symbol mappings are conducted, etc. Optimizations may include, without limitation, loop unrolling and loop splitting. This information in annotated listing 516 may be used by both the analysis tools at delinquent memory operation analysis stage and the compiler at the re-compilation stage to generate optimized executable code 512.

In another example, compiler 506 uses memory usage information generated during execution of the application at runtime to annotate object code to form optimized executable code 512. Compiler 506 generates the executable code 518 to run it on simulator or machine 520. Simulator or machine 520 is a hardware component, a software component, or a combination of hardware and software for performing dynamic analysis of the executable code 518. Simulator or machine 520 executes executable code 518 to identify the location of delinquent memory operation instructions in the code and the number of cache misses associated with each delinquent memory operation instruction.

Analysis tools 522 are software and/or hardware tools for analyzing the information gathered at runtime. Analysis tools 522 can include one or more analysis tools, including, but not limited to, a performance monitoring unit, a counter for counting a number of processor cycles consumed during execution of each instruction, and/or any other analysis tools to gather and analyze the dynamic information.

Analysis tools 522 dynamically discover the location or address of delinquent memory operation instructions in the executable code 518 and map the address of the delinquent memory operation instructions in the executable code back to a location or address of the corresponding instruction or statement in application source code 504 based on the static information obtained from the compiler during static analysis 514 and dynamic information gathered at runtime.

After a delinquent memory operation instruction is identified at the instruction level, it may be difficult to map the instruction address to the user's application source code level without the help of compiler 506. Compiler 506 may be necessary to reconstruct the mapping to the user code, especially when aggressive optimizations are applied to optimize the application execution. In this example, compiler 506 generates annotated listing 516 that is used by analysis tools 522 and compiler 506 to map delinquent memory operation instructions precisely to the user source code and/or compiler intermediate code. Analysis tools 522 discover delinquent memory operations at the instruction level and generate the delinquent memory operation information 528.

Analysis tools 522 generate delinquent memory operation data 528 based on trace data 524 and compiler annotated information 516. Compiler 506 keeps or stores delinquent memory operation data 528 for use in compilation of the application software in the future and/or for recompilation of the application software. Delinquent memory operation data 528 from user annotation 502, static analysis 514, and dynamic analysis may be persistently stored in database 526 for future utilization by compiler 506 and/or optimization tools. An optimization tool is a tool for improving the speed of software execution. For example, an optimization tool may include, but is not limited to, a scheduler for scheduling processes for execution on one or more processors associated with computer 500.

Delinquent memory operation data 528 may be stored in any type of data storage device, such as, but not limited to, a database, a hard disk, main memory, read-only-memory (ROM), non-volatile random access memory (NV-RAM), or a secondary storage device. In this example, delinquent memory operation data, such as the results of static analysis 514 and dynamic analysis performed by analysis tools 522, is stored in database 526. Database 526 may be a data storage device located locally to computer 500 as well as a data storage device located remotely to computer 500. In this example, database 526 is located locally to computer 500.

Compiler 506 then reads delinquent memory operation data 528 and performs precise memory reference mapping of both the internal intermediate representation of the application code, referred to as intermediate code, and application source code 504 at the user source level with a combination of dynamic profiling information and static analysis information. Compiler 506 recompiles the application code using delinquent memory operation data 528 to generate the optimized executable code 512 with improved quality and execution speed of code.

In other words, after a delinquent memory operation is identified and mapped to source code and/or intermediate code using user annotations 502, static analysis 514, and dynamic analysis, a memory delay directive is inserted into the source code and/or intermediate code. Currently, compilers, such as compiler 506, typically use one or more high-level and low-level intermediate representations of application source code 504 to facilitate compiler transformations and optimizations. In this example, two intermediate languages are used at high-level and low-level respectively.

At the high-level, a memory delay directive, such as, without limitation, "_mem_delay( )", is inserted in the high-level intermediate code before the statement containing the specified memory reference. An expression match mechanism is used to query if a given memory reference is delinquent. The memory delay directive at this high level, such as "_mem_delay( )", is a separate statement without side-effects. Therefore, the memory delay directive inserted in the code does not have a significant negative impact on the correct execution of the code or optimizations.

When the high-level intermediate representation is transformed into the low level intermediate representation during the low-level code generation, the memory delay directive in a statement is transformed into a directive instruction and associated with a delinquent memory operation instruction, such as a delinquent load or a delinquent store instruction. Thus, memory delay keeps delinquent memory operation information consistently across different optimization phases, such as low-level optimization and high-level optimizations.

A memory delay directive may be associated with a delinquent memory operation instruction by inserting the memory delay directive in a code region immediately before the delinquent memory operation instruction, immediately after the delinquent memory operation instruction, or by inserting or imbedding the memory delay directive within the delinquent memory operation instruction. In other words, the memory delay directive is inserted before the beginning of the delinquent memory operation instruction, after the end of the delinquent memory operation instruction, or at a location after the beginning but before the end of the delinquent memory operation instruction.

In another embodiment, a memory delay directive is associated with a delinquent memory operation instruction without inserting the memory delay directive within the source code, intermediate code, or executable code. For example, a marker directive with an index may be inserted in the code either before the delinquent memory operation instruction, after the delinquent memory operation instruction, or within the delinquent memory operation instruction. The marker directive is a reference or pointer to a side table or other memory location for storing delinquent memory operation instruction information. The delinquent memory operation instruction information may include, without limitation, an address of the delinquent memory operation instruction and/or a number of cycles expected to be required to execute the delinquent memory operation instruction.

Methods according to aspects of the present invention may be integrated into known profile directive feedback techniques. A profiling technique is a technique for using profiling data or other data regarding dynamic execution of the code gathered during the execution of the code. An example of a profiling technique is profile directed feedback (PDF). Profiling is usually performed by adding relevant instrumentation code to the program being compiled, and then executing that program to collect profiling data. Examples of profiling data include relative frequency of execution of one part of the program compared to others, values of expressions used in the program, and outcomes of conditional branches in the program. The optimizing compiler can use this data to perform code reordering, based on relative block execution frequencies, code specialization, based on value profiling, code block outlining, or other forms of optimization techniques that boost the final program's performance.

Traditional profile directed feedback optimizations require performing at least two separate steps: a compile instrumentation step with the representative training data to gather program behavior information, which can, according to aspects of the present invention, now include delinquent memory operation data 528 generated by analysis tools 522, and a re-compile step to optimize the code based on the gathered runtime program behavior information. With existing profile directed feedback optimizations methods, multiple runs may be required to gather the profile data.

Thus, in this example, a user may manually add user annotations 502 including memory delay 508 to application source code 504. When compiler 506 compiles application source code 504 and links it with runtime tracing library 510 to generate the executable code, compiler 506 may also add annotated hints information regarding possible delinquent code instructions, linker mapping information, and/or memory delay 508 to the source code and/or intermediate code during static analysis 514. Simulator or machine 520 executes the executable code to gather runtime tracing information through hardware performance counts. Compiler 506 may then add memory delay 508 to executable code 518.

Analysis tools 522 analyze the hardware trace data 524 and/or compiler and linker generated information to produce a file containing delinquent memory operation data 528. Delinquent memory operation data 528 includes, but is not limited to, file name, function name, line number, delinquent memory operation name, memory region identifier, memory region start address, and/or memory region size.

Compiler 506 reads in delinquent memory operation data 528 to perform memory reference mapping with the guidance of static analysis results and internal compiler database information to map delinquent memory operation instructions in the executable code precisely to both externally in the user source code and internally in the compiler intermediate code. Compiler 506 automatically inserts a memory delay instruction, such as memory delay 508, into the source code and/or intermediate code for all identified delinquent memory operations that cause cache misses above a certain threshold.

Thus, compiler 506 can insert a memory delay directive into compiled code automatically during initial compilation of application source code 504 during compile time and/or during recompilation of the application code based on delinquent memory operation data 528 gathered by analysis tools 522.

In this example, user annotation 502 added to program code by a user, static analysis 514 performed by compiler 506 during compile time, and dynamic analysis performed by analysis tools 522 during runtime [or later based on data gathered during runtime] are described as being used separately or independently to generate optimized executable code 512. However, user annotations 502, static analysis 514, and dynamic analysis may be used in combination to form optimized executable code. In other words, user annotations 502 may be used alone to generate optimized executable code 512, static analysis 514 may be used alone to generate optimized executable code 514, dynamic analysis may be used alone to generate optimized executable code 514, in addition, user annotations 502 and dynamic analysis may be used in combination to generate optimized executable code 512, user annotations 502 and static analysis 514 may be used in combination to generate optimized executable code 512, or static analysis 515 and dynamic analysis may be used in the absence of user annotations 502 to generate optimized executable code 512.

In this example, delinquent memory operation information from user annotation 502, static analysis 514, and/or dynamic profiling is available very early during the compiler stage, which is used to facilitate high-level memory hierarchy optimization and low-level instruction scheduling.

In this example, compiler 506 is an optimizing compiler. In another example, compiler 506 is a dynamic compiler. A dynamic compiler is a compiler that performs compilation of code during execution or runtime of the code. Dynamic compilation permits optimizations of the code to be made that can only be known or identified during runtime. A dynamic compiler can utilize the uniform interface provided by memory delay to query the existence of cache misses. In other words, during runtime, the dynamic compiler can utilize the memory delay uniform interface between compiler 506 and analysis tools 522 to dynamically identify delinquent memory operation instructions, the address or location of the delinquent memory operation instructions in the executable code, and/or the number of cache misses associated with each delinquent memory operation instruction.

Thus, memory delay identifies the address or location of delinquent memory operation instructions in the object code or executable code and maps the address back to an address or location of the instruction in the source code and/or intermediate code corresponding to the identified delinquent memory operation instruction. Delinquent memory operations can be identified approximately through global analysis, including, but not limited to, data flow analysis and/or access pattern analysis. Delinquent memory operation instructions in the source code and/or intermediate code are identified at an earlier stage of compilation either through user annotations 502, static analysis 514 by the compiler, and/or dynamic analysis. Once a delinquent memory operation is identified, a uniform memory delay interface is used in the code immediately prior to the delinquent memory operation instruction.

Memory delay 508 also identifies the number of memory latency cycles associated with each delinquent memory operation instruction. In one embodiment, a memory delay directive is only inserted in the code if the associated delinquent memory operation instruction causes a number of cache misses that is greater than a threshold number of cache misses.

Memory delay 508 provides the uniform interface to pass this delinquent memory operation data, such as an address of the delinquent memory operation instruction and/or the number of memory latency cycles associated with the delinquent memory operation instruction to various optimization phases consistently without a significantly negative performance impact through the same set of classes and built-in functions associated with memory delay 508.

Memory delay is a directive or framework for providing uniform interfaces internally and externally to communicate delinquent memory operation information between components during compilation of software code. A uniform user interface is an interface that permits both users external to the compiler and components external and internal to the compiler, to communicate information regarding delinquent memory operation instructions to the compiler.

Delinquent memory operation information added to application code by memory delay directives is useful for performing optimizations, such as instruction scheduling to move independent instructions in between a delinquent memory operation and instructions that depend on that load. Typical instruction scheduling algorithms make use of a data dependence graph (DDG). A data dependence graph encodes instructions as nodes in the graph and data dependences as edges with a numeric latency. The user-specified information that a load has a latency of "N" cycles is simply used to modify the data dependence graph by overwriting the latency on edges between the delinquent memory operation and all uses of the loaded value. The effect is that independent instructions are likely to be scheduled in between the delinquent memory operation and its dependent instructions due to the long latency on the edges. This technique can effectively hide the long latency of a cache miss by executing other instructions while the data is retrieved.

In certain hardware architectures, the identification of delinquent memory operations may also be useful so that these loads can be grouped together or spread apart during execution of instruction in a pipeline or during parallel processing of instructions. For example, some hardware architectures stop execution after a first cache miss, but may have a limited look-ahead capacity to identify other cache misses. In such a case, delinquent memory operations can be scheduled closer together. However, on other platforms, where the hardware can support a certain number of outstanding cache misses while continuing execution, it is advantageous to avoid exceeding the maximum number of outstanding misses. Therefore, memory delay might optimize application execution by moving delinquent memory operations farther apart from each other during execution.

The identification of delinquent memory operations may also be useful for optimizations, such as loop unrolling. For example, if a certain load is identified to have a latency of 40 cycles, and that load is located in a loop that would otherwise execute in 11 cycles and that has no loop carried dependences, then unrolling that loop by a factor of 4 may allow that load to be scheduled 40 cycles away from dependent uses, with the unrolled loop executing in 44 cycles and 11 cycles executing per iteration of the original loop. This is particularly important for hardware architectures that do not include rotating registers.

Figure 6:
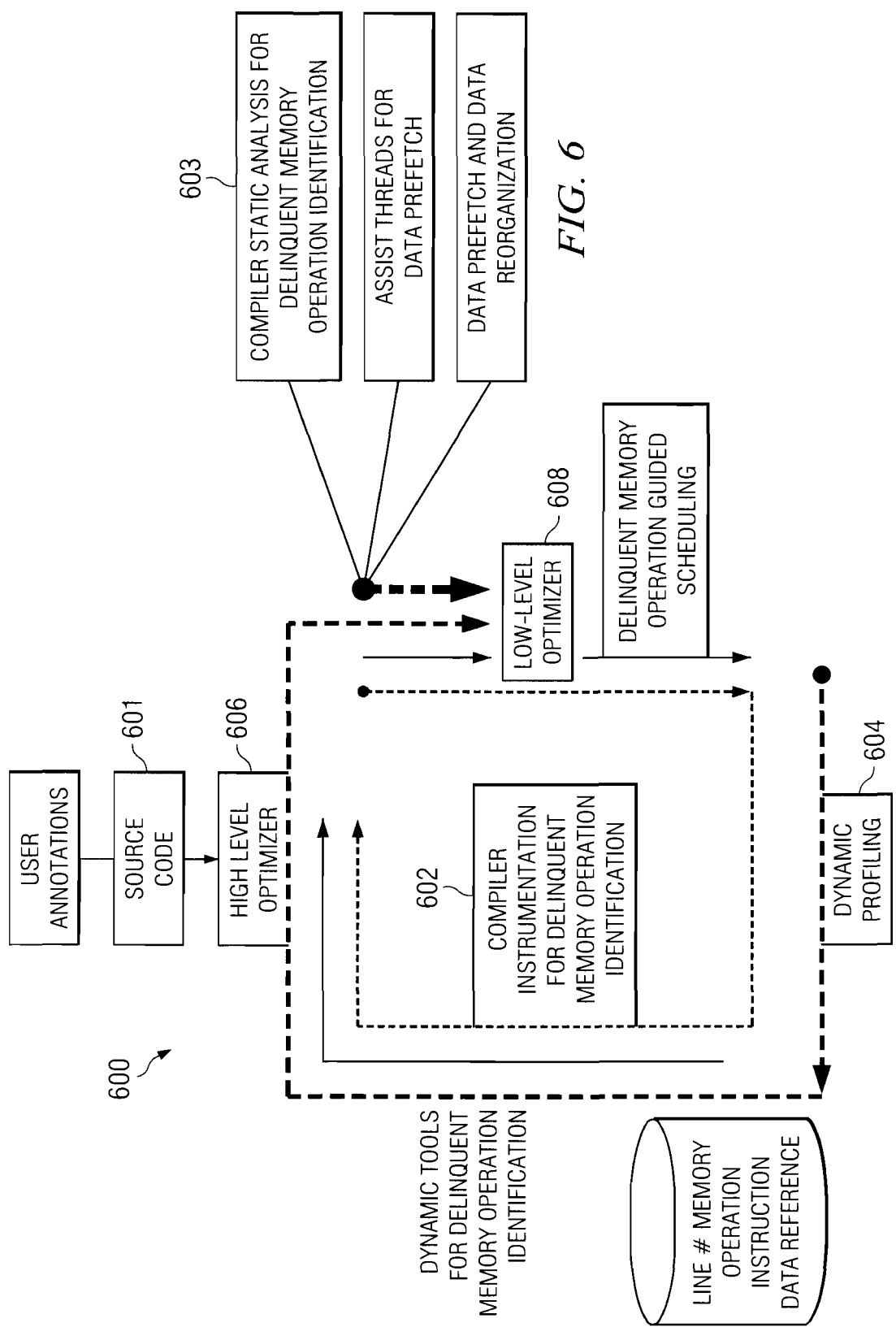
FIG. 6 is a block diagram illustrating a data flow through a uniform interface for providing delinquent information to a compiler in accordance with an illustrative embodiment.

FIG. 6 is a block diagram illustrating a data flow through a uniform interface for providing delinquent information to a compiler in accordance with an illustrative embodiment. FIG. 6 shows the external use of the uniform interface for providing delinquent information to a compiler from user annotations and/or dynamic profiling tools, and the internal use of the interface in the compiler in accordance with this illustrative embodiment. In this example, data processing system 600 is a data processing system, such as, without limitation, data processing system 100 in FIG. 1, data processing system 200 in FIG. 2, or data processing system 500 in FIG. 5.

A user may add user annotations to source code 601 manually prior to compiling source code 601 in a compiler. The user annotations may include a memory delay directive, such as user annotations 502 in FIG. 5. During compile time, a compiler may also add a memory delay directive to source code and/or intermediate code.

Memory delay provides compiler instrumentation 602 to identify the address or location of each delinquent memory operation instruction in the executable code and the number of cache misses associated with each instance of a delinquent memory operation instruction. Compiler instrumentation 602 may be a compiler, such as compiler 506 in FIG. 5. Compiler instrumentation performs compiler static analysis 603 to identify delinquent memory operation instructions to form delinquent memory operation instruction data. The delinquent memory operation instruction data is data regarding expected delinquent memory operation instructions identified through analysis of the source code by compiler instrumentation 602 during compile time.

Memory delay provides a dynamic analysis interface associated with runtime analysis tools that generate performance tool feedback. Performance tool feedback during dynamic profiling 604 uses delinquent memory operation data generated by dynamic tools during runtime to identify the address or location of each delinquent memory operation instruction in the executable code and the number of cache misses associated with each instance of a delinquent memory operation instruction. Dynamic profiling 604 is performed or implemented by a simulator or machine, such as simulator or machine 520 in FIG. 5.

A user can also insert user annotations with memory delay directive in the user generated source code. In this manner, memory delay also provides a user interface for a user to communicate delinquent memory operation information to the compiler.

Scheduling, data pre-fetching, and data re-organization can be performed by compiler optimizers, such as high-level optimizer 606 and low-level optimizer 608, to optimize execution of the application code 610. High-level optimizer 606 is an optimizer that is independent of the underlying machine type on which the application is executed. Low-level optimizer 608 is an optimizer that is relatively more dependent on the machine type on which the application is being executed than a higher-level optimizer. In other words, a low-level optimizer may only work on a particular type of computing device whereas a high-level optimizer may be functional on a number of different machine types. In this example, two optimizers are provided. However, a single optimizer or three or more optimizers may also be utilized in accordance with the illustrative embodiments.

Thus, in this example, the compiler passes delinquent memory operation information to various optimizers, such as high-level optimizer 606 and low-level optimizer 608, consistently and without substantial negative performance impact. The memory delay interface provides a uniform interface that includes a compiler framework to identify and communicate delinquent memory operation information from various components at different levels the application compilation and execution back to the compiler.

A framework is a compiler software infrastructure and organization for enabling communication regarding delinquent memory operation instructions from a user and/or software components to the compiler and/or optimization tools. The uniform interface of memory delay is utilized externally at the user level, internally, at high optimization level, and/or at low optimization level. In other words, memory delay provides an interface to the compiler that allows different components to communicate in a uniform manner at the user level, at the compiler level, at runtime, and/or at the optimization level.

Figure 7:
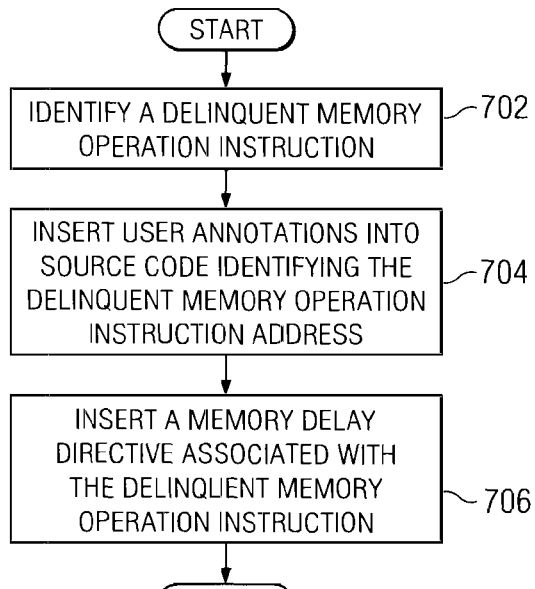
FIG. 7 is a flowchart illustrating a process for using user annotations for improving application performance in accordance with an illustrative embodiment.

Next, FIG. 7 is a flowchart illustrating a process for using user annotations for improving application performance in accordance with an illustrative embodiment. In this illustrative example shown in FIG. 7, the process is performed by a user.

The process begins when a user identifies a delinquent memory operation instruction in source code (step 702). The user inserts user annotations into the source code to provide hints identifying addresses of possible delinquent memory operation instructions (step 704). The user inserts a memory delay directive in association with each delinquent memory operation instruction (step 706) with the process terminating thereafter. A memory delay directive may be inserted in code region containing the delinquent memory operation instruction before the delinquent memory operation instruction, after the delinquent memory operation instruction, or the memory delay directive may be inserted within the delinquent memory operation instruction. The memory delay directive may also be inserted in a code region that does not contain the delinquent memory operation instruction. The different code region may be a code region located in the code before the code region containing the delinquent memory operation instruction or after the code region containing the delinquent memory operation instruction. In another example, rather than inserting the memory delay directive, a marker may be inserted into a code region associated with the delinquent memory operation instruction. The marker references a location in a table containing the address of the delinquent memory operation instruction and/or the number of cycles expected to be required or used for the delinquent memory operation instruction to execute.

Figure 8:
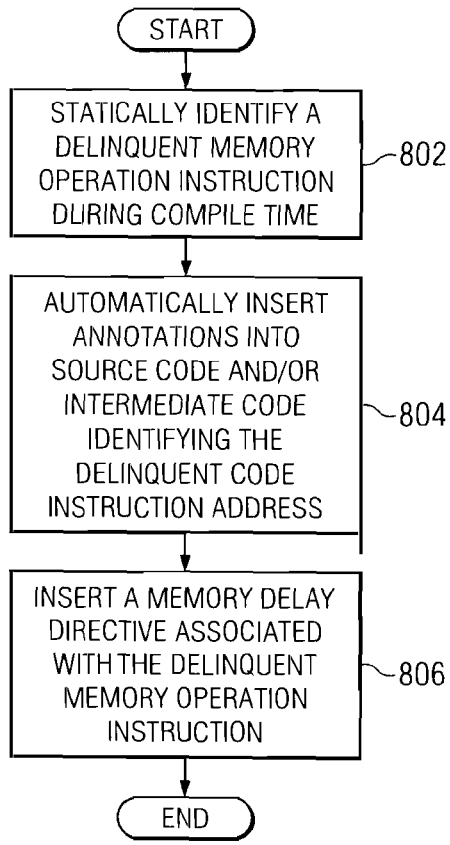
FIG. 8 is a flowchart illustrating a process for using annotated listing data generated based on a static analysis during compile time for improving application performance in accordance with an illustrative embodiment.

Referring now to FIG. 8, a flowchart illustrating a process for compilers to do static analysis during compile time for improving application performance is shown in accordance with an illustrative embodiment. In this illustrative example shown in FIG. 8, the process is performed by compiler 506 of FIG. 5.

The process begins by identifying a delinquent memory operation through compiler static analysis during compile time (step 802). Any known or available method for statically identifying delinquent memory operations may be used. The process automatically inserts compiler generated annotations into the source code and/or intermediate code to provide hints or suggestions as to the addresses of possible delinquent memory operation instructions (step 804). The process inserts a memory delay directive in association with the delinquent memory operation instruction in the compiled executable code (step 806) with the process terminating thereafter.

Figure 9:
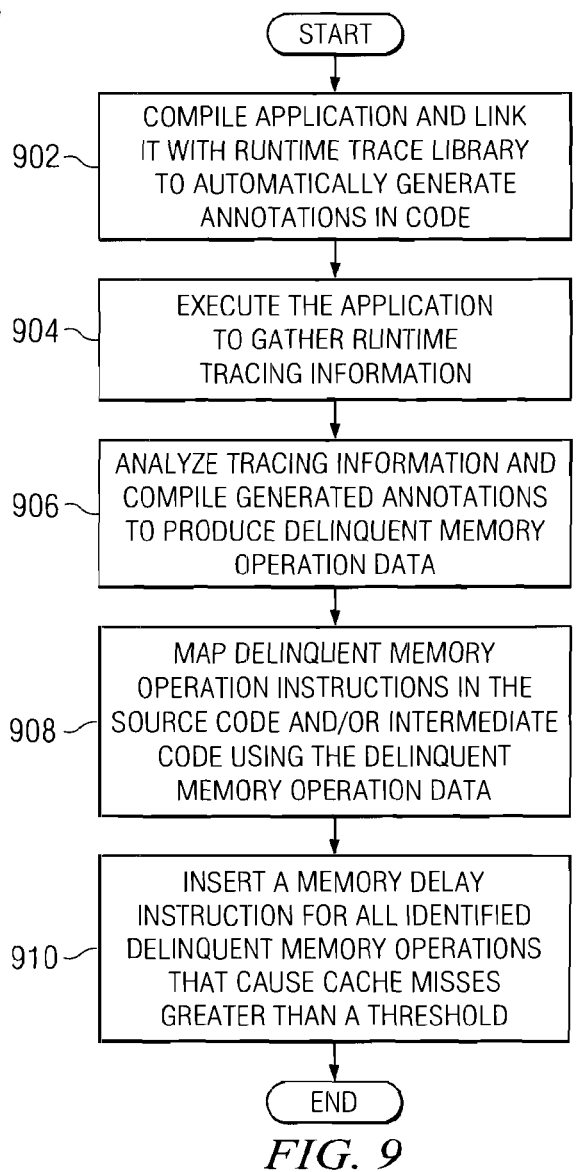
FIG. 9 is a flowchart illustrating a process for using an annotated listing generated by dynamic analysis tools for improving application performance in accordance with an illustrative embodiment.

FIG. 9 is a flowchart illustrating a process of dynamic profiling for improving application performance in accordance with an illustrative embodiment. In this illustrative example shown in FIG. 9, the process is performed by compiler 506 of FIG. 5.

The process begins by compiling an application and linking the application with a runtime trace library, such as runtime trace library 406 in FIG. 4, to automatically generate annotations in the source code and/or intermediate code regarding possible delinquent memory operation instructions (step 902). The process executes the application to gather runtime tracing information (step 904) regarding the steps in execution of the application. The process analyzes the tracing information and compiler generated annotations to produce delinquent memory operation data (step 906). The process maps delinquent memory operation instructions into the source code and/or intermediate code using the delinquent memory operation data (step 908). The process inserts a memory delay directive into the code for each identified delinquent memory operation instruction that causes a number of cache misses that is greater than a threshold number of cache misses (step 910) with the process terminating thereafter. The memory delay directive may be inserted in the code section before an identified delinquent memory operation instruction, after an identified delinquent memory operation instruction, or imbedded within an identified delinquent memory operation instruction. In addition, a directive marker pointing to delinquent memory operation information in a table may be inserted into the code region instead of the memory delay directive and/or in addition to the memory delay directive.

Therefore, the illustrative embodiments provide a computer implemented method, apparatus, and computer program product for improving application performance. A delinquent memory operation is a static instruction which has a large memory latency due to numerous cache misses. A memory delay directive is inserted in a code region immediately preceding the delinquent memory operation instruction. The directive indicates an address of the delinquent memory operation instruction and a number of memory latency cycles expected to be required for the delinquent memory operation instruction to execute to form annotated code. Information included in the annotated code is used to optimize execution of an application associated with the delinquent memory operation instruction.

Thus, the illustrative embodiments provide a uniform interface internally and externally to represent a delinquent memory operation instruction, dynamically discover delinquent memory operations during runtime, identify the address of delinquent memory operations statically during compile time, store and pass delinquent memory operation information to various aggressive optimization phases consistently without substantial negative performance impact through the same uniform interface, guide both high-level cache locality transformation and low-level instruction scheduling using the delinquent memory operation information, and query the existence of cache misses dynamically during runtime of executable code. The term dynamically refers to a continuous change or activity. Delinquent memory operations can be discovered dynamically during runtime while the application is executing and the application is changing as it executes.

The delinquent memory operation information may be used by the compiler and/or optimization tools to refine instruction groups in an instruction execution pipeline without changing runtime cache behavior. In this manner, memory delay facilitates the discovery of particular delinquent memory operation instructions and/or delinquent data store instructions more precisely. Delinquent memory operation information generated and communicated to the compiler and other components via memory delay's uniform interface can be used during high-level and/or low-level compiler optimizations to improve the performance of the compiled code. For example, this information may be used to guide data prefetch, data reorganizations at high-level, and instruction selection, speculation, scheduling, and loop unrolling optimizations at low-level.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for improving application performance, the computer implemented method comprising:

identifying a delinquent memory operation instruction, wherein the delinquent memory operation instruction is an instruction associated with cache misses that exceeds a threshold number of cache misses; and inserting a directive in a code region associated with the delinquent memory operation to form annotated code, wherein the directive indicates an address of the delinquent memory operation instruction and a number of memory latency cycles expected to be required for the delinquent memory operation instruction to execute.

2. The computer implemented method of claim 1 wherein the directive is inserted in the code region to provide a uniform interface to preserve delinquent memory operation instruction information.

3. The computer implemented method of claim 1 further comprising:

optimizing execution of an application associated with the delinquent memory operation instruction using information obtained from the annotated code.

4. The computer implemented method of claim 1 wherein the delinquent memory operation instruction is identified dynamically during runtime.

5. The computer implemented method of claim 1 wherein the delinquent memory operation instruction is identified statically during compile time.

6. The computer implemented method of claim 1 wherein the directive in the code region is inserted in the code region automatically by a compiler.

7. The computer implemented method of claim 3 wherein optimizing execution of the application further comprises:

scheduling execution of a set of two or more instructions to reduce a memory latency delay during execution of the set of two or more instructions, wherein the set of two or more instructions includes the delinquent memory operation instruction.

8. The computer implemented method of claim 6 wherein the compiler is an optimizing compiler that automatically inserts the directive in the code region, and wherein the code region is associated with the delinquent memory operation instruction.

9. The computer implemented method of claim 1 wherein inserting a directive in a code region associated with the delinquent memory operation to form annotated code further comprises:

inserting the directive in the code region immediately preceding the delinquent memory operation instruction.

10. The computer implemented method of claim 1 wherein inserting a directive in a code region associated with the delinquent memory operation to form annotated code further comprises:

inserting a marker in the code region associated with the delinquent memory operation, wherein the marker references a memory location that contains the address of the delinquent memory operation instruction and the number of memory latency cycles expected to be required for the delinquent memory operation instruction to execute.

11. A computer program product comprising:

a non-transitory computer usable medium including computer usable program code for improving application performance, said computer program product comprising:

computer usable program code for identifying a delinquent memory operation instruction, wherein the delinquent memory operation instruction is an instruction that causes cache misses that exceeds a threshold number of cache misses; and computer usable program code for inserting a directive in a code region associated with the delinquent memory operation to form annotated code, wherein the directive indicates an address of the delinquent memory operation instruction and a number of memory latency cycles expected to be required for the delinquent memory operation instruction to execute.

12. The computer program product of claim 11 wherein the directive is inserted in the code region to provide a uniform interface to preserve delinquent memory operation instruction information.

13. The computer program product of claim 11 wherein computer usable program code for inserting a directive in a code region associated with the delinquent memory operation to form annotated code further comprises:

computer usable program code for inserting the directive in a code region immediately preceding the delinquent memory operation instruction.

14. The computer program product of claim 11 further comprising:

computer usable program code for optimizing execution of an application associated with the delinquent memory operation instruction using information obtained from the annotated code.

15. The computer program product of claim 11 wherein the delinquent memory operation instruction is identified dynamically during runtime.

16. The computer program product of claim 11 wherein the delinquent memory operation instruction is identified statically during compile time.

17. The computer program product of claim 11 wherein the directive in the code region is inserted in the code region automatically by a compiler.

18. The computer program product of claim 11 wherein computer usable program code for inserting a directive in a code region associated with the delinquent memory operation to form annotated code further comprises:

computer usable program code for inserting a marker in the code region associated with the delinquent memory operation, wherein the marker references a memory location that contains the address of the delinquent memory operation instruction and the number of memory latency cycles expected to be required for the delinquent memory operation instruction to execute.

19. A data processing system for providing a uniform interface to preserve delinquent memory operation instruction information, the data processing system comprising:

a bus;

a storage device coupled to the bus, wherein the storage device contains computer usable code;

a communications unit coupled to the bus; and a processing unit coupled to the bus, wherein the processing unit executes the computer usable code to identify a delinquent memory operation instruction, wherein the delinquent memory operation instruction is an instruction associated with cache misses that exceeds a threshold number of cache misses; and insert a directive in a code region associated with the delinquent memory operation to form annotated code, wherein the directive indicates an address of the delinquent memory operation instruction and a number of memory latency cycles expected to be required for the delinquent memory operation instruction to execute.

20. The data processing system of claim 19 wherein the code region associated with the delinquent memory operation is a code region immediately preceding the delinquent memory operation instruction.

21. The data processing system of claim 19 wherein a uniform interface to preserve delinquent memory operation instruction information is provided by inserting the directive in the code region associated with the delinquent memory operation.

22. The data processing system of claim 19 wherein the processing unit further executes the computer usable program code to optimize execution of an application associated with the delinquent memory operation instruction using information obtained from the annotated code.

23. The data processing system of claim 19 wherein the delinquent memory operation instruction is identified statically during compile time.

24. The data processing system of claim 19 wherein the delinquent memory operation instruction is identified dynamically during runtime.

25. A system for improving application performance, the system comprising:
   at least one processing unit for executing computer usable program code; and
   a compiler for identifying a delinquent memory operation instruction that causes a number of cache misses that exceeds a threshold number of cache misses and inserting a directive in a code region associated with the delinquent memory operation instruction, wherein the directive indicates an address of the delinquent memory operation instruction and a number of cycles expected to be required for the delinquent memory operation instruction to execute to form annotated code.

26. The system of claim 25 further comprising:
   a memory delay interface, wherein the memory delay interface provides a uniform interface for at least one analysis tool to communicate delinquent memory operation instruction information to the compiler.

27. The system of claim 25 further comprising:
   at least one optimization tool, wherein the at least one optimization tool utilizes information included in the annotated code to optimize execution of an application associated with the delinquent memory operation instruction.

28. The system of claim 27 wherein the at least one optimization tool includes a process scheduler for scheduling execution of processes on the at least one processing unit.

29. The system of claim 27 wherein the at least one optimization tool includes a high level optimizer and a low level optimizer, and wherein the memory delay interface facilitates communication between the high level optimizer and the low level optimizer.

30. The system of claim 25 further comprising:
   a user interface, wherein the user interface is a uniform interface for a user to manually insert user annotations into a region of code associated with a delinquent memory operation instruction, and wherein user annotations identify the delinquent memory operation instruction.

31. The system of claim 25 wherein the compiler identifies the delinquent memory operation instruction statically during compile time and wherein the directive in the code region is inserted in the code region automatically by the compiler.

32. The system of claim 25 wherein the delinquent memory operation instruction is identified dynamically during runtime.

33. The system of claim 25 wherein the code region associated with the delinquent memory operation is a code region immediately preceding the delinquent memory operation instruction.

* * * * *